April 11, 1950     C. N. HICKMAN     2,503,270
TRAP FOR ROCKET PROPELLANTS
Filed Nov. 16, 1944
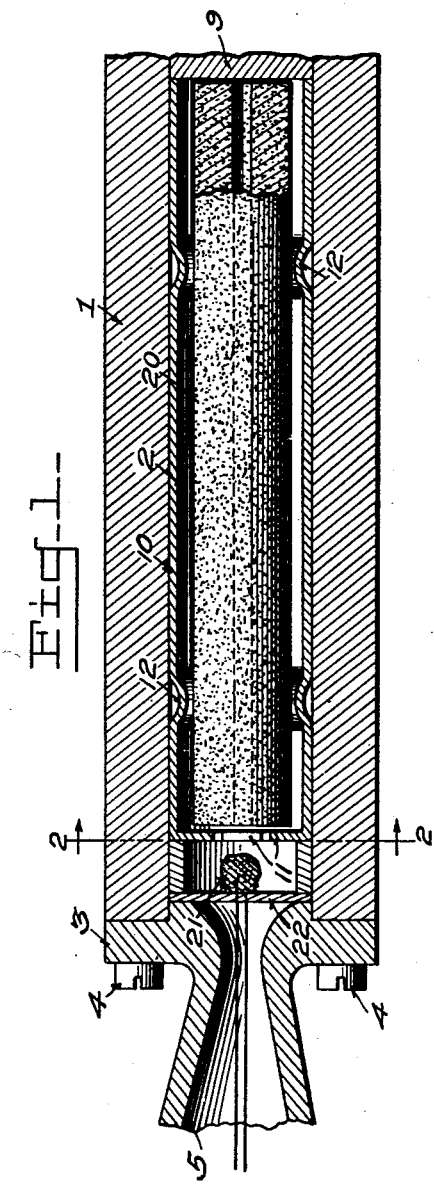
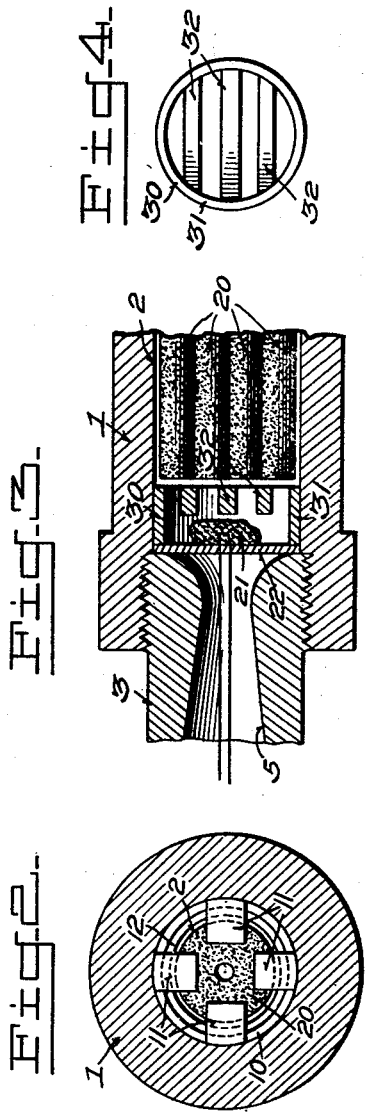
Inventor
CLARENCE N. HICKMAN,
By C. E. Herrstrom & H. E. Thibodeau
Attorneys Patented Apr. 11, 1950

2,503,270

UNITED STATES PATENT OFFICE 2,503,270

TRAP FOR ROCKET PROPELLANTS

Clarence N. Hickman, Jackson Heights, N. Y.

Application November 16, 1944, Serial No. 563,735

1 Claim. (Cl. 60—35.6)

(Granted under the act of March 3, 1883, as amended April 30, 1928; 370 O. G. 757)

The invention described herein may be manufactured and used by or for the Government for governmental purposes without the payment to me of any royalty thereon.

This invention relates to rocket projectiles and particularly to traps utilized to retain propellents within the combustion chamber of the rocket projectile.

One of the well recognized difficulties encountered in rocket projectiles utilizing powder as propellent, was the retention of the powder grains within the rocket motor combustion chamber until all of the powder was substantially consumed in combustion.

The following factors contributed to the difficulties encountered; first, a high inertia force is produced on the propellent due to the initial rapid acceleration of the rocket projectile. Such force naturally tends to discharge the propellent out of the rear of the projectile; secondly, the high velocity turbulent flow of gases generated by the combustion of the propellent tends to carry the propellent out of the combustion chamber; thirdly, a trap which is effective in retaining small pieces of the propellent within the motor chamber is generally found to offer too much resistance to the flow of gases out of the chamber, hence permitting dangerous build-up of pressure within the chamber.

Accordingly it is an object of this invention to provide improved traps for the propellent of a rocket projectile.

A particular object of this invention is to provide an efficient trap for a rocket motor wherein such trap is of generally cylindrical shape and readily adaptable to quantity manufacture.

The specific nature of the invention as well as other objects and advantages thereof will clearly appear form a description of a preferred embodiment as shown in the accompanying drawing in which:

Fig. 1 represents a longitudinal sectional view of a rocket motor embodying this invention showing a cylindrical trap member surrounding the propellent charge.

Fig. 2 is a cross sectional view taken along the plane 2—2 of Fig. 1.

Fig. 3 is a view similar to Fig. 1 of a modification of this invention showing a cylindrical trap member located to the rear of the propellent charge.

Fig. 4 is a front elevational view of the trap member shown in Fig. 3.

Referring to Fig. 1 there is shown in assembled relation the combustion chamber or rocket motor of a rocket projectile comprising a hollow cylindrical housing 1 defining a rearwardly opening cylindrical chamber 2. A nozzle member 3 is secured to rear end of housing 1 as by bolts 4. Nozzle member 3 is hollow and its hollow portion is shaped to define a Venturi nozzle 5. In accordance with this invention, a trap 10 is provided comprising a cylindrical piece of tubing of such dimension as to fit snugly against the walls of combustion chamber 2 and to be retained therein by nozzle member 3. The rear of trap 10 is slotted to produce a plurality of oppositely disposed tabs 11 which are bent inwardly to form the retaining portion of the trap. A propellent charge comprising a long cylindrical powder grain 20 is mounted within the trap 10 and retained therein until substantially consumed by combustion by the bent over tabs 11 of the trap. The wall of trap 10 is preferably indented as shown at 12 at several places along the length of trap 10 so as to support the powder grain 20 within the center of trap 10. The powder grain 20 is ignited by any conventional form of igniter such as an electrical squib 21 mounted on a blowout disk 22 positioned adajacent the nozzle member 3.

A modified form of improved trap construction is disclosed in Fig. 3. As shown in this figure the nozzle member 3 is screw fastened into the rear end of housing 1. A plurality of powder sticks 20 of relatively large diameter are loosely loaded into combustion chamber 2, lying substantially parallel to the axis of the chamber and are retained therein by a trap member 30. Trap member 30 comprises a short tubular body portion 31 which fits snugly within combustion chamber 2 and has a plurality of transverse rods 32 suitably secured, as by welding, across the forward end of tubular body 31. The rods 32 in effect form a grill which retains the powder sticks 20 within the combustion chamber 2 until they are substantially consumed. The trap member 30 is in turn retained within the combustion chamber 2 by the nozzle member 3.

It is apparent that the described trap constitutes a simple, readily manufacturable structure which positively retains the propellent charge within the combustion chamber until the propellent is substantially consumed and which nevertheless does not impair the flow of the gases developed within such chamber.

I claim:

A rocket motor comprising in combination, a tubular housing open at the rear and closed at its forward end, a hollow trap member in said tubular housing, a propellent charge insertable within said trap member, said trap member having inwardly projecting tabs at the rear end thereof constructed and arranged to retain said propellent charge within said tubular housing until said charge is substantially consumed, a nozzle member secured to the rear portion of said tubular housing, the forward part of said nozzle extending partly across the open rear end of said housing so as to retain said trap member within said tubular housing and a plurality of inwardly projecting indentations in said trap member arranged to engage and support said propellent charge centrally within said trap member.

CLARENCE N. HICKMAN.

REFERENCES CITED

The following references are of record in the file of this patent:

UNITED STATES PATENTS

| Number | Name | Date |
| --- | --- | --- |
| 961,179 | Unge | June 14, 1910 |
| 2,447,758 | Lubbock et al. | Aug. 24, 1948 |

FOREIGN PATENTS

| Number | Country | Date |
| --- | --- | --- |
| 831,496 | France | June 7, 1938 |